Aug. 21, 1956  R. E. RISLEY  2,759,744
HOLLOW LUGGED PIPE COUPLING
Filed March 31, 1953  3 Sheets-Sheet 1

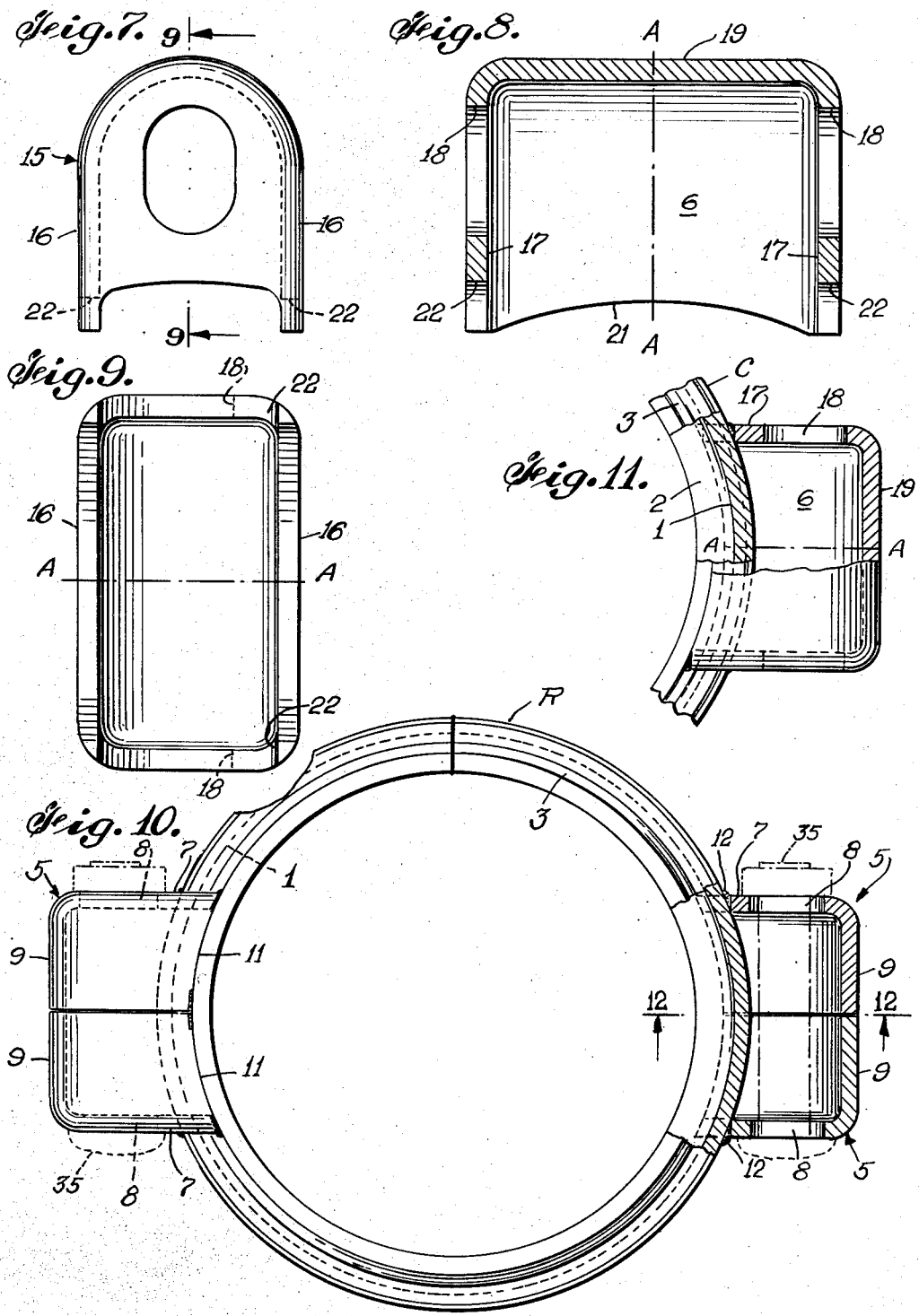

Aug. 21, 1956  R. E. RISLEY  2,759,744
HOLLOW LUGGED PIPE COUPLING
Filed March 31, 1953  3 Sheets-Sheet 3
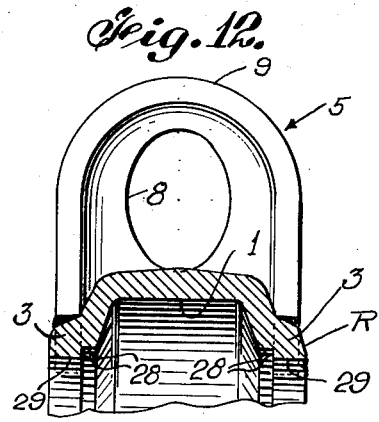
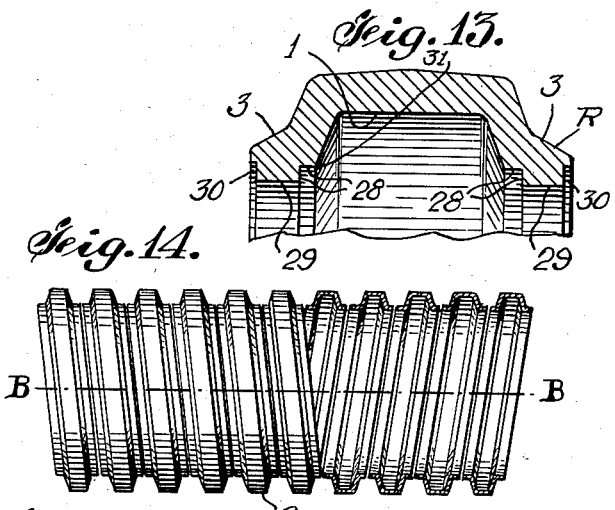
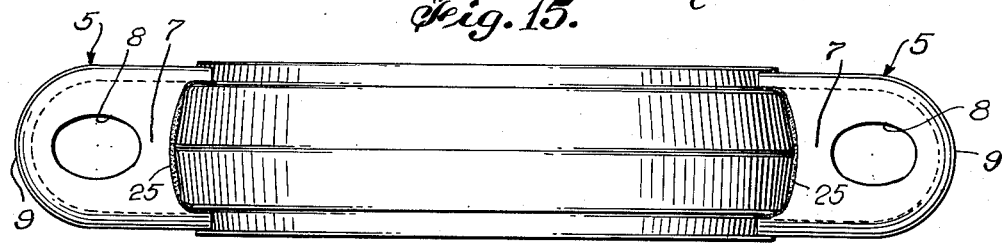
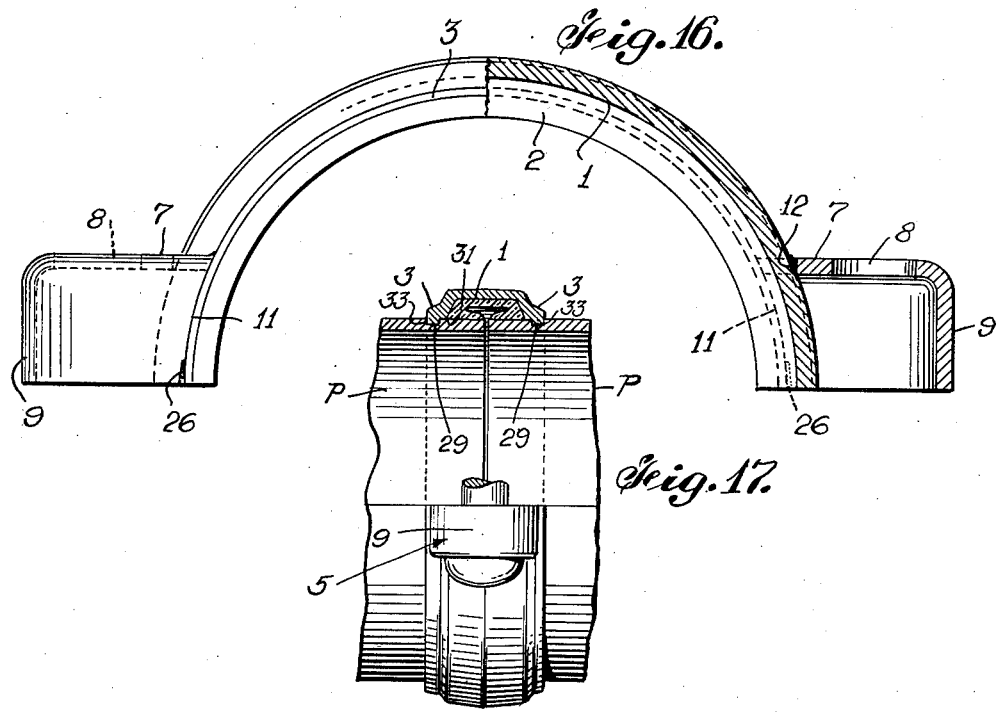

United States Patent Office 2,759,744
Patented Aug. 21, 1956

2,759,744

HOLLOW LUGGED PIPE COUPLING

Roger E. Risley, Bradford, Pa., assignor to Dresser Industries, Inc., Dallas, Tex., a corporation of Pennsylvania Application March 31, 1953, Serial No. 345,952

2 Claims. (Cl. 285—112)

The present invention relates to pipe couplings of the self-sealing gasket type for grooved-end pipe. A coupling of this type comprises an annular member of channel cross section that surrounds the abutting ends of two lengths of pipe and locks into grooves provided near the ends of the pipe. The annular channel is preferably made in two or more arcuate sections that are bolted together. An annular gasket having a C-shaped cross section is confined in the channel and has lip portions engaging the adjacent end portions of the pipe. Line pressure acts to press the lips of the gasket against the pipe to provide a fluid-tight seal.

The arcuate channel sections of couplings of this type have heretofore customarily been made as castings. The cast sections are usually externally ribbed and are made quite heavy in order to have adequate strength. Couplings made in this way are expensive to manufacture and, because of their weight, are expensive to ship and difficult to handle.

It is an object of the present invention to provide an improved method of making couplings of the self-sealing gasket type whereby such couplings can be made much lighter and less expensive. The decrease in weight not only represents a substantial saving in metal but also reduces shipping costs and makes the couplings easier to handle during manufacture and shipping and in the field. The improved method in accordance with the invention also results in improved couplings having important advantages over the couplings presently available.

The objects and advantages of the invention will be more fully understood from the following description and claims in conjunction with the accompanying drawings, in which:

Fig. 7 is a plan of a double lug that is later cut in two to form two bolt lugs.

Fig. 8 is an end elevation of the double lug shown in Fig. 7.

Fig. 9 is a section taken on the line 9—9 in Fig. 7.

Fig. 10 is an end elevation partly in section of the ring shown in Fig. 3 with four bolt lugs welded on.

Fig. 11 is a fragmentary end elevation similar to a portion of Fig. 10 but showing a double lug like that of Figs. 7 to 9 welded on the ring.

Fig. 12 is a cross section taken on the line 12—12 in Fig. 10.

Fig. 13 is a cross section similar to Fig. 12 but showing a modified shape.

Fig. 14 is a side elevation partly in section showing a helically coiled channel formed in accordance with a modification of the process.

Fig. 15 is a plan of a finished coupling section.

Fig. 16 is an end view of the coupling section shown in Fig. 14 with a portion shown in section.

Fig. 17 is a side elevation partly in longitudinal section showing a coupling installed on a pipeline.

The method of making a coupling in accordance with the present invention comprises the steps of forming a straight steel strip or bar with a channel cross section that is substantially the desired cross section of the finished coupling, bending the resulting channel to arcuate form, punching and pressing flat steel stock to form boxlike bolt lugs and welding the lugs to the arcuate channel sections.

Figure 1:
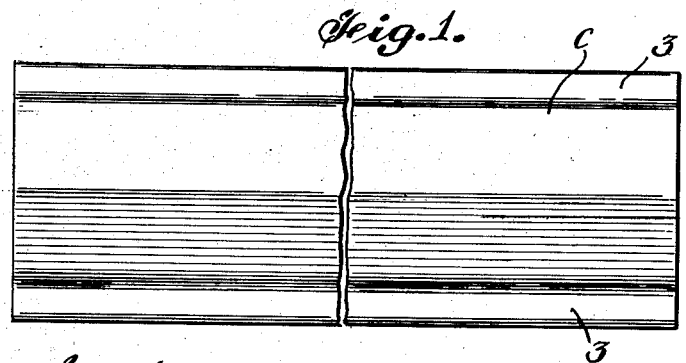
Fig. 1 is a plan of a straight bar of channel cross section that is later bent to form a coupling section in accordance with the invention.
Figure 2:
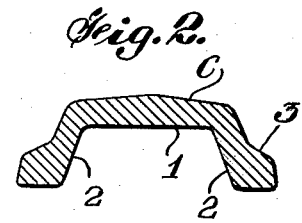
Fig. 2 is a cross section of the bar shown in Fig. 1.

The channel is first formed as a straight strip or bar C of channel cross section, as illustrated in Figs. 1 and 2. For example, the channel section bar C may be formed by hot or cold rolling, suitably shaped rolls being employed to give the desired channel cross section. In section, the channel comprises a central portion 1 and symmetrical side portions 2. The central portion 1 is substantially flat and of approximately uniform thickness although it may be slightly thicker in the middle, as shown in Fig. 2. The side portions 2 are divergent, being inclined at an angle of approximately 15 to 30 degrees to the plane of symmetry of the channel. The edges of the side portions 2 are thickened to provide outwardly projecting lateral flanges 3. All of the corners are rounded. It will be seen that the channel is of such cross section that it can be readily rolled.

Figure 3:
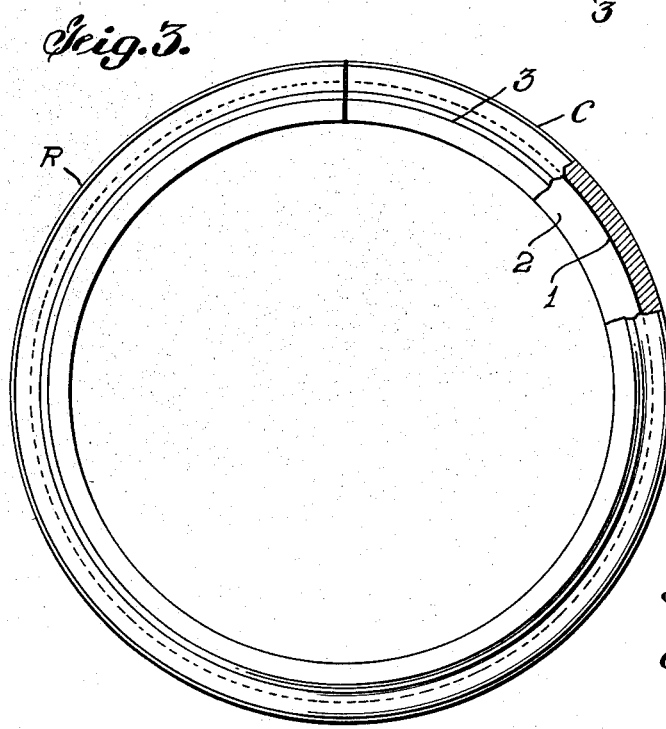
Fig. 3 is an end elevation partly in section showing the bar of Fig. 1 bent into circular form with the ends welded together to form a ring.

After the channel C has been rolled to the desired cross section, it is bent to arcuate form. In the process as illustrated by Fig. 3, a piece of the channel is cut to a length slightly greater than the circumferential length of the coupling to be made and then progressively bent, for example by bending rolls, to form a complete circle with opposite ends of the channel abutting one another. The abutting ends are butt-welded together, for example by flash welding, to form a solid ring R, as shown in Fig. 3. The slight excess length of the channel provides the necessary metal for the "push up" in flash welding the ends together. Any excess metal at the weld is ground off to provide a smooth, round continuous ring.

Figure 4:
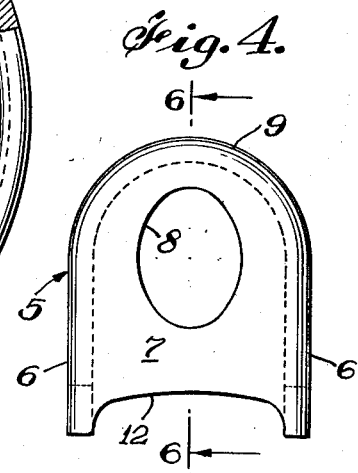
Fig. 4 is a plan of a bolt lug for the coupling.
Figure 5:
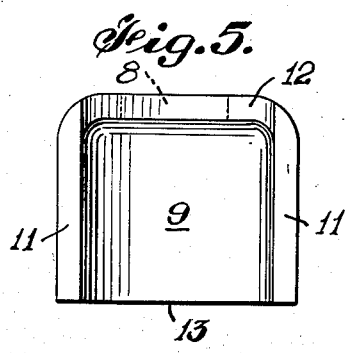
Fig. 5 is an end elevation of the lug shown in Fig. 4.
Figure 6:
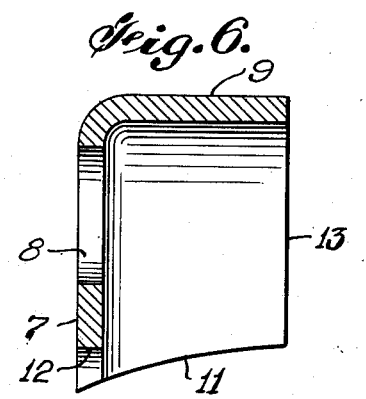
Fig. 6 is a section taken on the line 6—6 in Fig. 4.

Bolt lugs for the coupling are made from flat stock by punching a blank to the required shape and pressing or drawing the blank to form a hollow lug. As illustrated in Figs. 4 to 6, each of the lugs 5 has opposite side walls 6 which are preferably parallel to one another and spaced apart a distance equal to the spacing of the flanges 3 of the channel C. An end wall 7 integral with the side walls extends across between the side walls and closes the end of the lug except for an oval bolt hole 8 that is preferably formed by punching. An approximately semicylindrical outer wall 9 joins the side walls 6 and is spaced radially outwardly from the channel C. The outer wall 9 is integral with the side walls 6 and end wall 7. Inner edges 11 of the side walls 6 are arcuately concave (Fig. 6) with a curvature conforming to the curvature of the side flange portions 3 of the channel C (Figs. 2 and 3) and bear radially on said flanges. The inner edge 12 of the end wall 7 is concave and has a curvature conforming to the cross sectional curvature of the portion of the channel C between the side flanges 3. The bolt hole 8 is spaced radially outwardly from the inner edge 12 of the end wall 7 so that this edge is continuous. The opposite end 13 of the lug is open and lies in a plane approximately perpendicular to the arcuate inner edges 11 of the side walls 6.

In Figs. 7 to 9, there is illustrated a double bolt lug which is subsequently cut in two to form two lugs like the one illustrated in Figs. 4 to 6.

The double lug 15 is formed by punching a blank from flat stock and then pressing or drawing the blank to the shape shown. The double blank has opposite side walls 16 which are preferably parallel to one another and integral top and bottom end walls 17 (which, in the finished lugs, are both considered top end walls) having oval bolt holes 18. The double lug has an integral outer wall 19 which is preferably semi-cylindrical, as shown. The opposite side walls have inner edges 21 that are arcuately concave with a curvature corresponding to that of the side flanges 3 of the ring shown in Fig. 3. The inner edges 22 of the end walls 17 of the lug are concave with a curvature corresponding to the cross sectional curvature of that portion of the channel C between the side flanges 3. It will be seen that the double lug 15 is symmetrical and is hence of a desirable shape to be produced by a pressing or drawing operation. When cut in two on the line A—A (Figs. 8 and 9), the double lug provides two single lugs like that shown in Figs. 4 to 6, corresponding portions being designated by the same reference numerals increased by 10.

Four of the bolt lugs 5 are positioned on the previously formed ring R (Fig. 3). As illustrated in Fig. 10, a pair of lugs is positioned with their open ends facing one another on one side of the ring and a second pair of lugs is similarly positioned on the diametrically opposite side of the ring. The arcuately concave side edges 11 of each lug straddle the central portion of the channel and rest on the laterally projecting side flanges 3, thereby positioning the lug accurately with respect to the channel. A spacer is preferably placed between the two lugs of a pair to hold them a slight distance apart. With the lugs thus positioned, they are welded to the channel by making a weld 25 (Fig. 15) along the concave upper edge of the lug which extends transversely of the channel and short welds 26 (Fig. 16) at the lower end portions only of the arcuately concave side edges of the lug, the remainder of the side edge being left unwelded. Care is taken to prevent the transverse weld from extending over the sides of the channel. Because of the small amount of welding required, the cost of making the welds is kept at a minimum and distortion of the channel by the heat of welding is avoided.

Fig. 11 illustrates the use of double lugs such as that shown in Figs. 7 to 9 instead of single bolt lugs. Double lugs 15 are welded on diametrically opposite sides of the ring, one lug on each side. Welds 25 and 26 are made in like manner, it being understood that the side welds 26 are positioned on either side of the center of each side edge of the lug. Preferably, a small gap is left in the weld at the exact center, to leave room for making a cut.

Either before or after the lugs have been welded on, the ring is subjected to a machining operation, for example by turning or boring, to cut a right-angled groove 28 (Fig. 12) at the inside corner of each of the side edges of the channel. This leaves an inwardly projecting tongue or rib 29 of such thickness as to engage in the annular grooves customarily provided on pipe that is to be joined by couplings of this kind. In some instances it is desirable to make a similar cut 30 at the outside corner of each side edge of the channel (Fig. 13). When the same cross sectional size of channel is used for different sizes of couplings, the cut 30 may be made in the smaller diameter couplings and omitted in the larger diameter couplings in order to provide greater width of the tongue 29.

The ring R is then cut into two arcuate members or sections by making a cut on the line A—A in Figs. 10 and 11. In the form shown in Fig. 10, the cut is between the two lugs of the opposite pair. When using double lugs, as illustrated in Fig. 11, the cut is made through the centers of the lugs, so that both the ring and the lugs are cut in two. The ring may be cut in any desired manner although it has been found preferable to make the cut by sawing. When using separate lugs, as shown in Fig. 10, the two lugs of a pair are spaced apart just enough to permit the saw blade to pass between them. Thus, in both forms shown, the ends of the lugs are substantially flush with the end of the channel sections.

While it has been found preferable to form a complete ring, as described above, and then cut it in two, since this assures uniform curvature of the coupling throughout its circumferential extent, the coupling sections can, if desired, be made separately by bending a length of the channel shown in Figs. 1 and 2 to semicircular form (Fig. 16) and then welding the lugs on, as described. If the two halves of a coupling are separably formed, they are held in a jig or clamp while machining the tongues 29 so that the latter are truly circular. Alternatively, a longer length of the channel shown in Figs. 1 and 2 is wound into spiral form, as illustrated in Fig. 14, and the spiral is then cut along the line B—B. The cut may be made along one side only of the helically wound channel so as to produce a series of rings which are straightened and then processed as described above. The ends of the ring may be welded together or the ring, if desired, may be left open at one side and then cut at the opposite side after the bolt lugs have been welded on. Alternatively, the helically wound channel may be cut at opposite sides in a diametrical plane so as to produce a plurality of semi-circular channel sections to which bolt lugs are welded, as described above.

The completed coupling is illustrated in Figs. 15 to 17, the latter figure showing a coupling installed on the pipe. The channel forming the coupling is uniform throughout its circumferential extent and both its outer and inner surfaces are smooth and uniform. In cross section, the coupling has a substantially cylindrical central portion and sloping side walls the edges of which are thickened to form laterally projecting flange portions. The machined tongues 29 fit in grooves 33 provided in the pipe P (Fig. 17) and an annular shoulder 31 formed by the cut 28 (Fig. 12) closely embraces the pipe to prevent pinching of the gasket between the pipe and the coupling.

Although light in weight, the coupling produced by the method of the present invention is strong. The fibers of the rolled channel sections extend predominately in a lengthwise direction, i. e. circumferentially of the coupling, and the rolled channel is free from bubbles, voids or other defects such as sometimes occur in castings. The steel has a high tensile strength after heat treatment with a yield point above 50,000 lbs. per square inch—preferably at least 55,000 lbs.—and an ultimate strength above 70,000 lbs. per square inch—preferably at least 90,000.

The form of the bolt lugs and the manner in which they are attached further contribute to the strength of the coupling while keeping the weight at a minimum. The pull of the bolts 32 on the lugs draws the adjacent ends of the channel section toward one another and also exerts a turning moment on the lugs. The moment tends to turn the left hand lug 9 shown in Fig. 16 in a counterclockwise direction. This moment is resisted by the welded bond 25 between the upper edge of the lug and the channel. The radially outward pull of the lug would tend to bend, and thereby flatten, the channel on the line where the upper edge of the lug is attached. However, since the upper edge of the lug is shaped to fit the cross sectional curvature of the channel and is welded to the channel along a curved line, the upper wall 7 of the lug acts as a transverse web to stiffen and strengthen the channel at the line of stress, to maintain the cross sectional channel shape of the channel and thereby resist the forces tending to bend and flatten it. The lower corners of the lug press inwardly on the side flanges 3 of the channel near its ends, thereby holding the end portions of the inwardly projecting ribs or tongues 29 firmly in the grooves 33 in the pipe and resisting the line pressure which acts on the channel through the gasket. Moreover, it will be seen that with applicant's construction the turning moment on the lugs is reduced to a minimum since the bolts 35 (Fig. 10) extending through the lugs pass close to the abutting ends of the channel sections and the wall of the channel is relatively thin so that the bolts are close to the pipe.

The construction in accordance with the invention reduces both the weight and the overall dimensions of the coupling, as indicated by the following tabulation:

| Nominal Diameter | Overall Width, inches | Overall Depth, inches | Thickness, inches | Cross Section Area, square inches |
|---|---|---|---|---|
| 4 | 2 | 3/4 | 3/16 | .60 |
| 6 | 2 | 3/4 | 3/16 | .60 |
| 8 | 2½ | 7/8 | 9/32 | .91 |
| 10 | 2½ | 7/8 | 9/32 | .91 |
| 12 | 2½ | 7/8 | 9/32 | .91 |

As will be seen from the foregoing tabulation, the wall thickness of the channel is between 2% and 5% of the nominal diameter of the coupling. This variation results from the fact that, for economic reasons, it is desirable to use the same rolled channel section for a series of different coupling sizes. Thus, for example, one channel section may be used for 4" and 6" couplings while another channel section is used for 8", 10" and 12" couplings. Hence, in the smaller sizes, in the range for which a particular channel section is used, the channel is somewhat heavier than would be required for strength. It has been found that a channel wall thickness that is 2% or 3% of the nominal diameter of the coupling provides adequate strength for the pressures encountered in pipe lines on which couplings of the self-sealing gasket type are normally used.

It will be understood that the invention is not limited to the specific details of the embodiments herein illustrated and described. For example, the machining of the grooves 28 and 30 may be eliminated, e. g. by rolling the grooves in the straight bar section or by omitting one or both of the grooves. Still other modifications will be apparent to those skilled in the art.

What I claim and desire to secure by Letters Patent is:

1. A light weight pipe coupling of the self-sealing gasket type for joining grooved-end pipe, comprising a plurality of end-abutting arcuate coupling members, each comprising a channel bent longitudinally to arcuate form, said channel opening radially inwardly and comprising in cross section a central peripheral portion and symmetrically diverging side portions extending laterally and radially inwardly from said central portion to define a gasket recess, the radially inner edges of said side portions being flared laterally outwardly to form laterally projecting side flanges, a gasket in said recess, a hollow lug at each end of each of said arcuate members, each of said lugs having opposite side walls which are spaced apart a distance equal to the spacing of said flanges and have arcuate concave inner edges bearing radially on said flanges, an integral outer wall joining said side walls and spaced radially outwardly from said member, said lug having one end open and substantially flush with the adjacent end of said member, an integral end wall closing the opposite end of said lug except for a bolt hole in said end wall, said end wall extending across between said side wall and joining said side walls and outer wall, said bolt hole being spaced radially outwardly from said arcuate member and said end wall having a concave inner edge fitting the cross sectional shape of the radially outer surface of said member between said side flanges, said inner edge of said end wall being welded throughout its extent to said member from one of said flanges to the other and thereby assisting in retaining the cross sectional shape of said member, end portions only of said inner edges of said side walls adjacent the open end of said lug being welded to said flanges, and bolts extending through said bolt holes of the lugs at abutting ends of said coupling members, the pull of said bolts when tightened forcing the inner edges of the side walls of said lugs radially inwardly against said flanges adjacent the ends of said members and thereby resisting gasket pressure acting outwardly on end portions of said members.

2. A pipe coupling according to claim 1, in which said channel is of uniform cross section throughout its length and has a wall thickness that is between 2% and 5% of the nominal diameter of the pipe, inner edge portions of said side portions of the channel being thickened by material forming said flanges.

References Cited in the file of this patent
UNITED STATES PATENTS

| | | |
|---|---|---|
| 1,894,321 | Nelson | Jan. 17, 1933 |
| 1,976,797 | Naylor | Oct. 16, 1934 |
| 2,130,324 | Monahan | Sept. 13, 1938 |
| 2,377,510 | Newell | June 5, 1945 |
| 2,427,685 | Midtlyng | Sept. 23, 1947 |
| 2,598,338 | Arbogast | May 27, 1952 |